(12) United States Patent
Lee et al.

(10) Patent No.: US 8,981,713 B2
(45) Date of Patent: Mar. 17, 2015

(54) CHARGING APPARATUS USING PAD TYPE ELECTRODE CONTACT POINT

(75) Inventors: Kwang Du Lee, Gyunggi-do (KR); Eung Ju Kim, Gyunggi-do (KR); Sang Hoon Hwang, Gyunggi-do (KR); Jun Ki Min, Gyunggi-do (KR); Chul Gyun Park, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 386 days.

(21) Appl. No.: 13/600,078

(22) Filed: Aug. 30, 2012

(65) Prior Publication Data

US 2013/0057202 A1    Mar. 7, 2013

(30) Foreign Application Priority Data

Sep. 2, 2011    (KR) .................. 10-2011-0089108

(51) Int. Cl.
| | | |
|---|---|---|
| *H02J 7/00* | (2006.01) | |
| *H02G 3/00* | (2006.01) | |
| *H02K 7/14* | (2006.01) | |
| *G01R 19/14* | (2006.01) | |
| *H02J 7/16* | (2006.01) | |
| *H02J 7/04* | (2006.01) | |

(52) U.S. Cl.
CPC ............. *H02J 7/0045* (2013.01); *H02K 7/14* (2013.01); *H02J 7/16* (2013.01); *H02G 3/00* (2013.01); *H02J 7/00* (2013.01); *H02J 7/04* (2013.01)
USPC ........... 320/107; 320/113; 320/115; 320/162; 320/165; 324/133; 310/50; 307/10.1

(58) Field of Classification Search
CPC ............. H02J 7/00; H02J 7/04; H02J 7/16; H02J 7/045; G01R 19/14; H02G 3/00; H02K 7/14

USPC .......... 320/107, 113, 115, 162, 165; 324/133; 307/10.1; 310/50

See application file for complete search history.

(56) References Cited

U.S. PATENT DOCUMENTS

| | | | | | |
|---|---|---|---|---|---|
| 4,320,333 | A | * | 3/1982 | Hase | 320/159 |
| 4,489,278 | A | * | 12/1984 | Sawazaki | 324/457 |
| 4,603,094 | A | * | 7/1986 | Yasuda | 429/91 |
| 4,616,171 | A | * | 10/1986 | Hernandez et al. | 320/142 |
| 4,658,593 | A | * | 4/1987 | Stenvinkel | 62/126 |
| 5,077,151 | A | * | 12/1991 | Yasuda et al. | 429/206 |
| 5,177,425 | A | * | 1/1993 | Goto | 320/130 |
| 5,469,043 | A | * | 11/1995 | Cherng et al. | 320/161 |
| 5,481,177 | A | * | 1/1996 | Hamley | 320/111 |
| 5,656,920 | A | * | 8/1997 | Cherng et al. | 320/161 |
| 5,963,008 | A | * | 10/1999 | Cordeiro et al. | 320/100 |
| 6,177,780 | B1 | * | 1/2001 | Roy et al. | 320/128 |
| 6,867,568 | B1 | * | 3/2005 | Olson et al. | 320/162 |
| 2004/0115519 | A1 | * | 6/2004 | Lee | 429/61 |
| 2005/0017685 | A1 | * | 1/2005 | Rees et al. | 320/132 |
| 2006/0132096 | A1 | * | 6/2006 | Maleus | 320/141 |
| 2007/0139004 | A1 | * | 6/2007 | Satsuma | 320/114 |
| 2010/0188048 | A1 | * | 7/2010 | Nishino et al. | 320/120 |
| 2010/0327809 | A1 | * | 12/2010 | Takaoka et al. | 320/118 |
| 2011/0039142 | A1 | * | 2/2011 | Kwag et al. | 429/99 |
| 2011/0064986 | A1 | * | 3/2011 | Ogasawara et al. | 429/121 |
| 2011/0064987 | A1 | * | 3/2011 | Ogasawara et al. | 429/121 |

FOREIGN PATENT DOCUMENTS

JP    2000060005 A    *    2/2000    ............. H02J 7/00

* cited by examiner

*Primary Examiner* — Phallaka Kik
(74) *Attorney, Agent, or Firm* — Ladas & Parry, LLP

(57) ABSTRACT

Disclosed herein is a charging apparatus using a pad type electrode contact point, the charging apparatus including: a charging plate having a plate shape; and an attaching plate installed on a portable terminal to provide the power to a charging circuit of the portable terminal.

8 Claims, 6 Drawing Sheets

CHARGING APPARATUS USING PAD TYPE ELECTRODE CONTACT POINT

CROSS REFERENCE TO RELATED APPLICATION

This application claims the benefit of Korean Patent Application No. 10-2011-0089108, filed on Sep. 2, 2011, entitled "Charging Equipment Using Pad Type Electrode Contact Point", which is hereby incorporated by reference in its entirety into this application.

BACKGROUND OF THE INVENTION

1. Technical Field

The present invention relates to a charging apparatus using a pad type electrode contact point.

2. Description of the Related Art

Due to the wide spreading of a portable phone in accordance with the development of a wireless communication technology, a ubiquitous information environment for everybody to transmit and receive desired information anytime and anywhere has been created.

However, up to now, communication terminal devices have depended on a battery, and terminals having battery of which power is rapidly consumed according to a use degree, such as a smart phone, have a limitation in which they should be recharged after being used for several hours.

Further, a jack of a charging adaptor should be intentionally connected to a wireless terminal in order to charge the wireless terminal, and a call can not but be made in a state in which a power line is connected to the wireless terminal during the charging of the wireless terminal.

In order to solve a problem such as a limitation of movement of a user of the wireless terminal due to the connection of the jack of the charging adaptor as described above, or the like, to provide convenience to the user, technologies of transmitting power using a magnetic coupling scheme based on Faraday's law have been developed.

An example of these technologies includes a magnetic resonant technology by energy conversion between a magnetic field and an electric field, a magnetic induction technology using magnetic coupling according to a transformer principle, and the like.

These two technologies, which are technologies by a magnetic coupling scheme, may be different in view of a coupling energy mechanism from each other. However, they may be similar to each other in that they uses an energy action between a transmit side primary coil and a receive side secondary coil.

In connection with this, in the magnetic resonance technology, energy is concentrated on a specific resonance frequency by a resonator configured of a coil type inductor L ad a capacitor C and is transmitted to a receive side in a magnetic energy form, and an LC resonator having the same resonance frequency as the specific resonance frequency receives the transmitted energy while showing a tuning phenomenon.

This scheme has an advantage in that relatively large energy may be transmitted up to several meters (m). However, since a transmission distance depends on a size of a coil, the size of the coil should be increased by an increased distance.

In addition, impedance mismatching is generated according to a distance between transmit and receive resonators to deteriorate efficiency. Therefore, an automatic impedance circuit is required.

Meanwhile, the magnetic induction technology uses relatively high power and has more excellent efficiency as compared to the magnetic resonance technology, such that it has been mainly used in manufacturing a charging pad type product. However, the magnetic induction technology has large disadvantages such as a rapid change in efficiency according to coil alignment and heat generation of a metal.

In addition, a pad type charger to which the magnetic induction scheme is similar to an electrode contact point scheme since an electrode is not exposed to the outside and a degree of freedom for a distance is not large.

Most of all, in the technologies of the magnetic coupling scheme, a series of processes of converting direct current (DC) power of an adaptor into alternate current (AC) power using a converter and transmitting the AC power to a receive side using a coil, at a transmit side, and converting the AC power into DC power through a rectifier should be performed. Due to these conversion processes, circuits may become complicated, efficiency may be decreased, and a manufacturing cost may be increased. In addition, since a high power magnetic field is used, sensitivity of a communication device such as a portable phone may be deteriorated.

SUMMARY OF THE INVENTION

The present invention has been made in an effort to provide a charging apparatus using a pad type electrode contact point that contacts electrodes without connecting a jack to a communication terminal.

According to a preferred embodiment of the present invention, there is provided a charging apparatus using a pad type electrode contact point, the charging apparatus including: a charging plate having a plate shape, including first and second contact point electrodes having polarities and formed to be exposed and a third contact point electrode not having a polarity and formed to be exposed, and receiving power from an adaptor when a charging voltage of a battery is sensed through the first contact point electrode, thereby providing the power through the second and third contact point electrodes; and an attaching plate installed on a portable terminal, including fourth and fifth contact point electrodes having shapes corresponding to those of the first and second contact point electrodes, polarities opposite to those of the first and second contact point electrodes, and formed to be exposed and a sixth contact point electrode having a shape corresponding to the third contact point electrode and formed to be exposed, sensing a remaining voltage of the battery to provide the remaining voltage to the first contact point electrode through the fourth contact point electrode, and receiving power provided from the second and third contact point electrodes through the fourth and sixth contact point electrodes to provide the power to a charging circuit of the portable terminal.

The charging plate may include the first and second contact point electrodes provided at a central portion thereof.

The second contact point electrode of the charging plate may be formed to enclose the first contact point electrode thereof.

The charging plate may further include a support formed on a rear surface thereof so as to support the charging plate to stand up the charging plate.

The charging plate may include: a first automatic switch switched on according to a switch control signal to provide the power supplied from the adaptor to the second contact point electrode; and a first switch control circuit generating the switch control signal when the charging voltage is sensed through the first contact point electrode, thereby switching on the first automatic switch.

The charging plate may include: a manual switch switched on an operation by a user to provide the power supplied from the adaptor to the first switch control circuit, and the first switch control circuit may switch on the first automatic switch when power supplied to the adaptor is sensed through the manual switch.

The attaching plate may include: a main attaching plate installed on the portable terminal, including the fourth and fifth contact point electrodes having the shapes corresponding to those of the first and second contact point electrodes, the polarities opposite to those of the first and second contact point electrodes, and formed to be exposed, sensing the remaining voltage of the battery to provide the remaining voltage to the first contact point electrode through the fourth contact point electrode, and receiving the power provided from the second contact point electrode through the fifth contact point electrode to provide the power to the charging circuit of the portable terminal; and a sub attaching plate installed on the portable terminal, including the six contact point electrode having the shape corresponding to that of the third contact point electrodes and formed to be exposed, and receiving the power provided from the third contact point electrode through the sixth contact point electrodes to provide the power to the charging circuit of the portable terminal.

The attaching plate may include: a charging voltage sensing unit detecting the remaining voltage of the battery to provide the remaining voltage to the fourth contact point electrode; a second automatic switch switched on to provide the power supplied through the fifth contact point electrode to the charging circuit; and a second switch control circuit generating a switch control signal when the voltage is sensed through the second contact point electrode, thereby switching on the second automatic switch.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
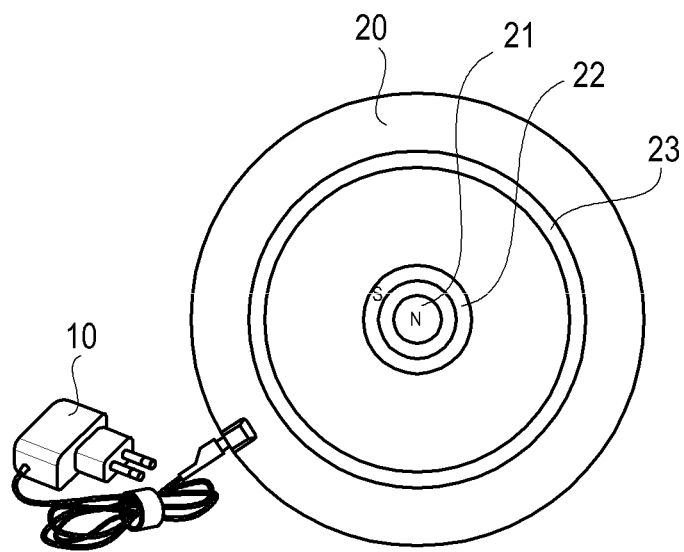
FIG. 1 is a perspective view of a power transmitting unit of a charging apparatus using a pad type electrode contact point according to a first preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

FIG. 1 is a perspective view of a power transmitting unit of a charging apparatus using a pad type electrode contact point according to a first preferred embodiment of the present invention.

Referring to FIG. 1, the power transmitting unit of the charging apparatus using a pad type electrode contact point according to the first preferred embodiment of the present invention may include an adaptor 10 receiving alternate current (AC) power, converting the AC power into direct current (DC) power having a predetermined voltage, and then outputting the DC power, and a charging plate 20 having a circular plate shape and including contact point electrodes 21, 22, and 23 exposed therein.

Here, the adaptor 10, which receives the AC power to generate the DC power, generally receives AC power of 110V to generate and output DC power of 5 V or less. A voltage range of the adaptor 10 is not limited to the exemplary range described above.

Figure 2:
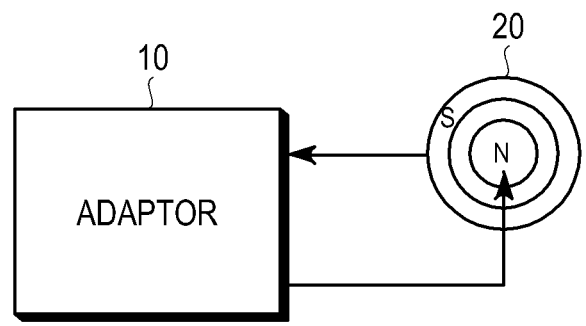
FIG. 2 is a view showing an internal wiring of the power transmitting unit of the charging apparatus using a pad type electrode contact point according to the first preferred embodiment of the present invention.

A connector jack, which is an output of the adaptor 10, is connected to a connector included in the charging plate 20 to supply the DC power to the contact point electrodes 21, 22, and 23, as shown in FIG. 2.

The charging plate 20 has the circular plate shape, and includes a first contact point electrode 21 formed at the center thereof and having a polarity of an N pole, a second contact point electrode 22 formed in the vicinity of the first contact point electrode 21 and having a polarity of an S pole, and a third contact point electrode 23 formed in the vicinity of the second contact point electrode 22 and not having a polarity.

Here, the charging plate 20 is not limited to having the circular plate shape, but may have several shapes such as a rectangular plate shape, a triangular plate shape, and the like.

In addition, the first and second contact point electrodes 21 and 22 of the charging plate 20 may be implemented to have the polarities of the N pole and the S pole, respectively. However, the first and second contact point electrodes 21 and 22 may be implemented to have polarities opposite to the above-mentioned polarities. Further, although the third contact point electrode 23 is implemented so as not to have the polarity, the third contact point electrode 23 may be implemented to have a polarity and the first or second contact point electrode 21 or 22 may be implemented so as not to have the polarity.

Further, although the first to third contact point electrodes 21 to 23 of the charging plate 20 are positioned at the center of the charging plate 20, the first to third contact point electrodes 21 to 23 are not limited to being positioned at the center of the charging plate 20, but be positioned at various positions.

Further, although the first contact point electrode 21 of the charging plate 20 is formed at the center of the charging plate 20 and the second contact point electrode 22 thereof is positioned in the vicinity of the first contact point electrode 21, the first and second contact point electrodes 21 and 22 may also be arranged in parallel with a bar magnet.

In the configuration as described above, one of the first contact point electrode 21, the second contact point electrode 22, and the third contact point electrode 23 is used as a control electrode, another thereof is used as a power supplying electrode, and the third thereof is used as a ground electrode.

Although the case in which the first contact point electrode 21 is used as the control electrode, the second contact point electrode 22 is used as the power supplying electrode, and the third contact point electrode 23 is used as the ground electrode has been described in the above-mentioned embodiment, the present invention is not limited thereto, but may be changed as needed.

Figure 3:
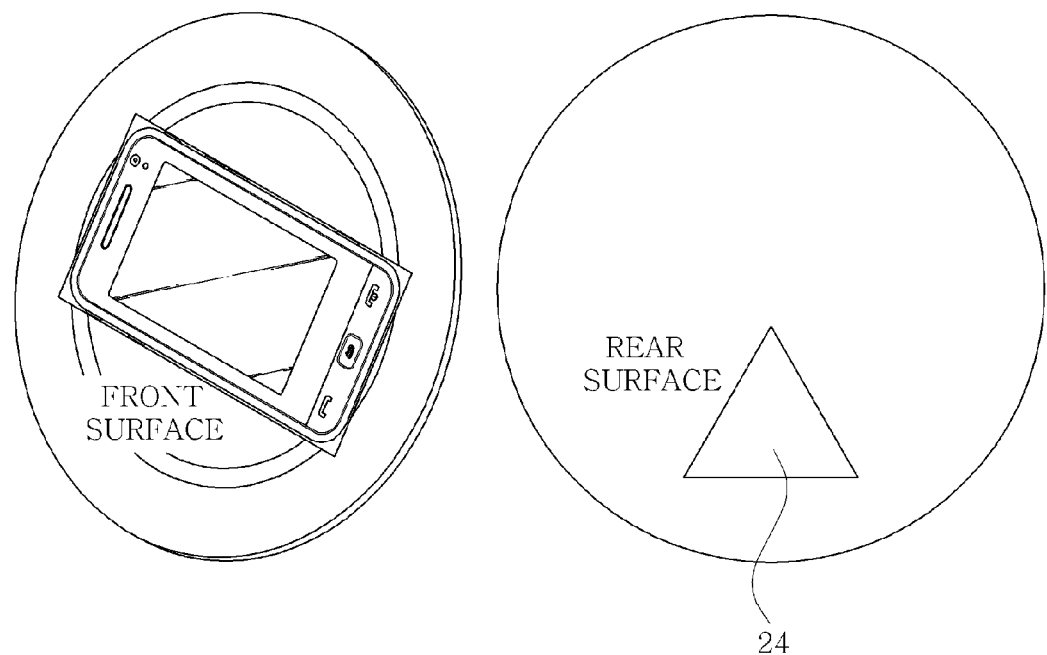
FIG. 3 is a perspective view of a rear surface of the power transmitting unit of the charging apparatus using a pad type electrode contact point according to the first preferred embodiment of the present invention.

Meanwhile, the charging plate 20 may be manufactured in a folder type in which it includes a support 24 provided on a rear surface thereof to stand up, as shown in FIG. 3.

The charging plate 20 as described above supplies power through the second and third contact point electrodes 22 and 23 when a remaining voltage of a battery of a portable terminal is detected through the first contact point electrode 21.

Figure 4:
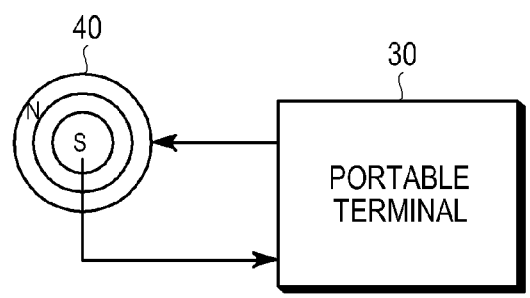
FIG. 4 is a perspective view of a power receiving unit of the charging apparatus using a pad type electrode contact point according to the first preferred embodiment of the present invention.

FIG. 4 is a perspective view of a power receiving unit of the charging apparatus using a pad type electrode contact point according to the first preferred embodiment of the present invention.

Referring to FIG. 4, the power receiving unit of the charging apparatus using a pad type electrode contact point according to the first preferred embodiment of the present invention may be installed on a rear surface of a portable terminal 30 and include a main attaching plate 40 in which contact point electrodes 41 and 42 are exposed and a sub attaching plate 50 in which another contact point electrode 43 is exposed. Although the case in which the contact point electrodes are provided in each of the main attaching plate 40 and the sub attaching plate 50 separate from the main attaching plate 40 has been described, all of the contact point electrodes may also be provided in a single attaching plate 40.

The portable terminal 30 includes a portable phone, a personal digital assistant (PDA), a smart phone, and the like. However, the portable terminal 30 is not limited thereto, but may include all terminals having mobility.

In addition, the main attaching plate 40 may have a shape corresponding to the first and second contact point electrodes 21 and 22 of the charging plate 20.

Figure 5:
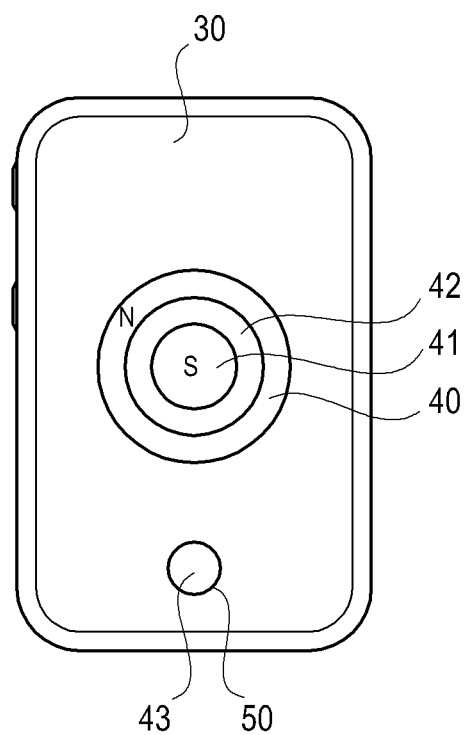
FIG. 5 is a view showing an internal wiring of the power receiving unit of the charging apparatus using a pad type electrode contact point according to the first preferred embodiment of the present invention.

Fourth and fifth contact point electrodes 41 and 42 of the main attaching plate 40 are electrically connected to the portable terminal 30 as shown in FIG. 5. One of these two contact point electrodes serves as a power supplying electrode and is connected to a charging circuit in the portable terminal 30 and the other thereof serves as a control electrode and is connected to a battery.

Figure 6:
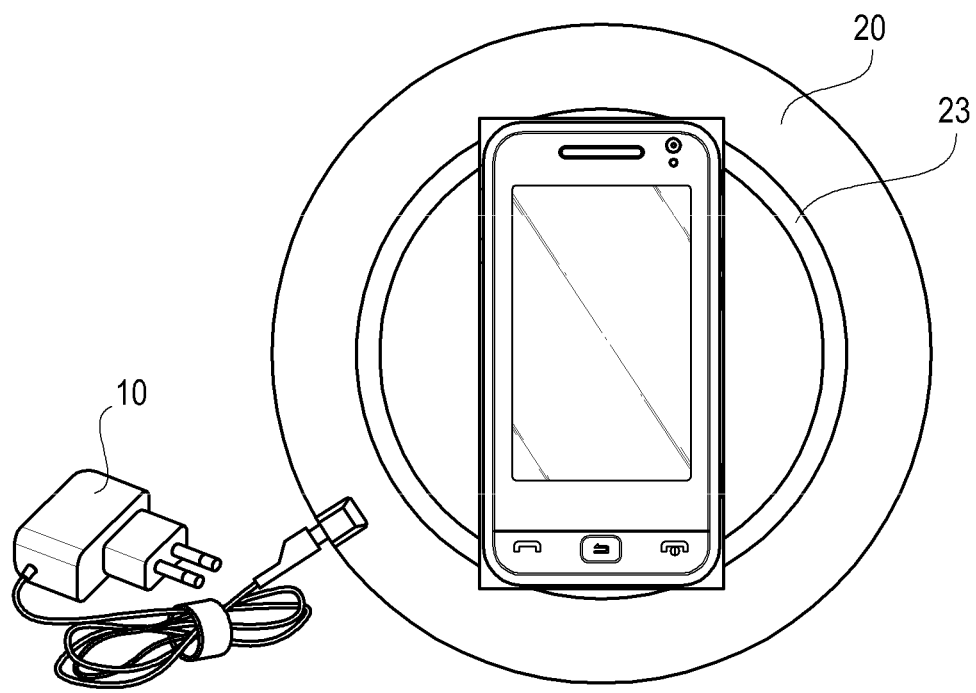
FIG. 6 is a view showing a state in which the power transmitting unit and the power receiving unit of the power transmitting unit of the charging apparatus using a pad type electrode contact point according to the first preferred embodiment of the present invention are attached to each other.

In the case in which the main attaching plate 40 as described above approaches the charging plate 20, as shown in FIG. 6, the fourth contact point electrode 41 having a polarity opposite to that of the first contact point electrode 21 is attached to the first contact point electrode 21 and the fifth contact point electrode 42 having a polarity opposite to that of the second contact point electrode 22 is attached to the second contact point electrode 22, such that the portable terminal is fixed and then charged.

Meanwhile, the sub attaching plate 50 is installed on the portable terminal 30 and includes a sixth contact point electrode 43 formed at a position corresponding to the third contact point electrode 23 of the charging plate 20, wherein the six contact point electrode 43 contacts the third contact point electrode 23 to thereby be electrically connected to the third contact point electrode 23 when the main attaching plate 40 is mounted on the charging plate 20. The sixth contact point electrode 43 serves as a ground electrode to provide a ground.

The functions of the contact point electrodes 41 to 43 are not limited thereto, but may be interchanged.

In the configuration as described above, in the case in which the portable terminal 30 is mounted on the charging plate 20, when the portable terminal 30 informs the charging plate 20 of a charging state of the battery through the fourth contact point electrode 41 of the main attaching plate 40, the portable terminal 30 receives power from the charging plate 20 through the fifth and sixth contact point electrodes 42 and 43 and supplies the power to the charging circuit therein to charge the battery.

Figure 7:
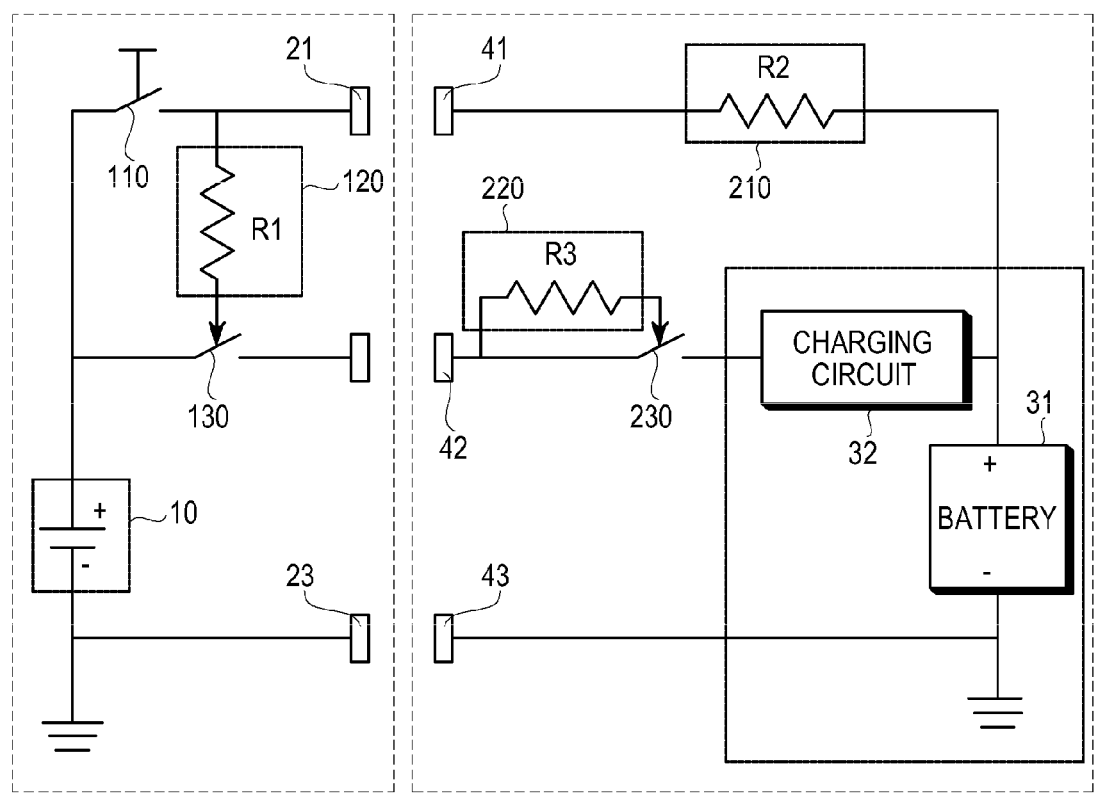
FIG. 7 is an internal circuit diagram of the charging apparatus using a pad type electrode contact point according to the first preferred embodiment of the present invention.

FIG. 7 is an internal circuit diagram of the charging apparatus using a pad type electrode contact point according to the first preferred embodiment of the present invention.

Referring to FIG. 7, the internal circuit of the power transmitting unit of the charging apparatus using a pad type electrode contact point according to the first preferred embodiment of the present invention includes a manual switch 110 having one terminal connected to the adaptor 10 and the other terminal connected to a switch control circuit 120, the switch control circuit 120 configured of a resistor R1 and having one terminal connected to the manual switch 110 and the first contact point electrode 21 which is a control electrode and the other terminal connected to an automatic switch 130, and the automatic switch 130 having one terminal connected to the adaptor 10 and the other terminal connected to the second contact point electrode 22.

The manual switch 110 is switched on by a manual operation by a user to provide the power supplied from the adaptor 10 to the switch control circuit 120.

In addition, the switch control circuit 120 is configured of the resistor R1 and one terminal connected to the manual switch 110 and the first contact point electrode 21 which is the control electrode. Therefore, the switch control circuit 120 receives the power from the adaptor 10 when the manual switch 110 is switched on or generates a switch control signal when a charging current of the battery is sensed through the first contact point electrode 21, thereby switching on the automatic switch 130.

Next, the automatic switch 130 is switched on when it receives the switch control signal input from the switch control circuit 120, thereby supplying the power supplied to the adaptor 10 to the second contact point electrode 22.

Meanwhile, in FIG. 7, the third contact point electrode 23 is connected to the sixth contact point electrode 43 connected to the battery 31 and provide a ground to the battery 31.

Next, referring to FIG. 7, the internal circuit of the power receiving unit of the charging apparatus using a pad type electrode contact point according to the first preferred embodiment of the present invention includes a charging voltage sensing unit 210 having one terminal connected to the battery 31 and the other terminal connected to the fourth contact point electrode 41 and configured of a resistor R2, a switch control circuit 220 having one terminal connected to the fifth contact point electrode 42, and an automatic switch 230 having one terminal connected to the fifth contact point electrode 42 and the other terminal connected to the charging circuit 32.

The charging voltage sensing unit 210 is connected to the battery 31 to sense a remaining charging voltage in the case in which the remaining charging voltage is present in the battery, thereby providing the remaining charging voltage to the first contact point electrode 21 of the power transmitting unit through the fourth contact point electrode 41.

In addition, the switch control circuit 220 generates a switch control signal in the case in which it receives the power supplied through the fifth contact point electrode 42, thereby switching on the automatic switch 230.

Next, the automatic switch 230 is switched on by the switch control circuit 220 and provides the power supplied through the fifth contact point electrode 42 to the charging circuit 32 to charge the battery 31.

Meanwhile, in FIG. 7, the sixth contact point electrode 43 is connected to the battery 31 and provides a ground to the battery 31.

Figure 8:
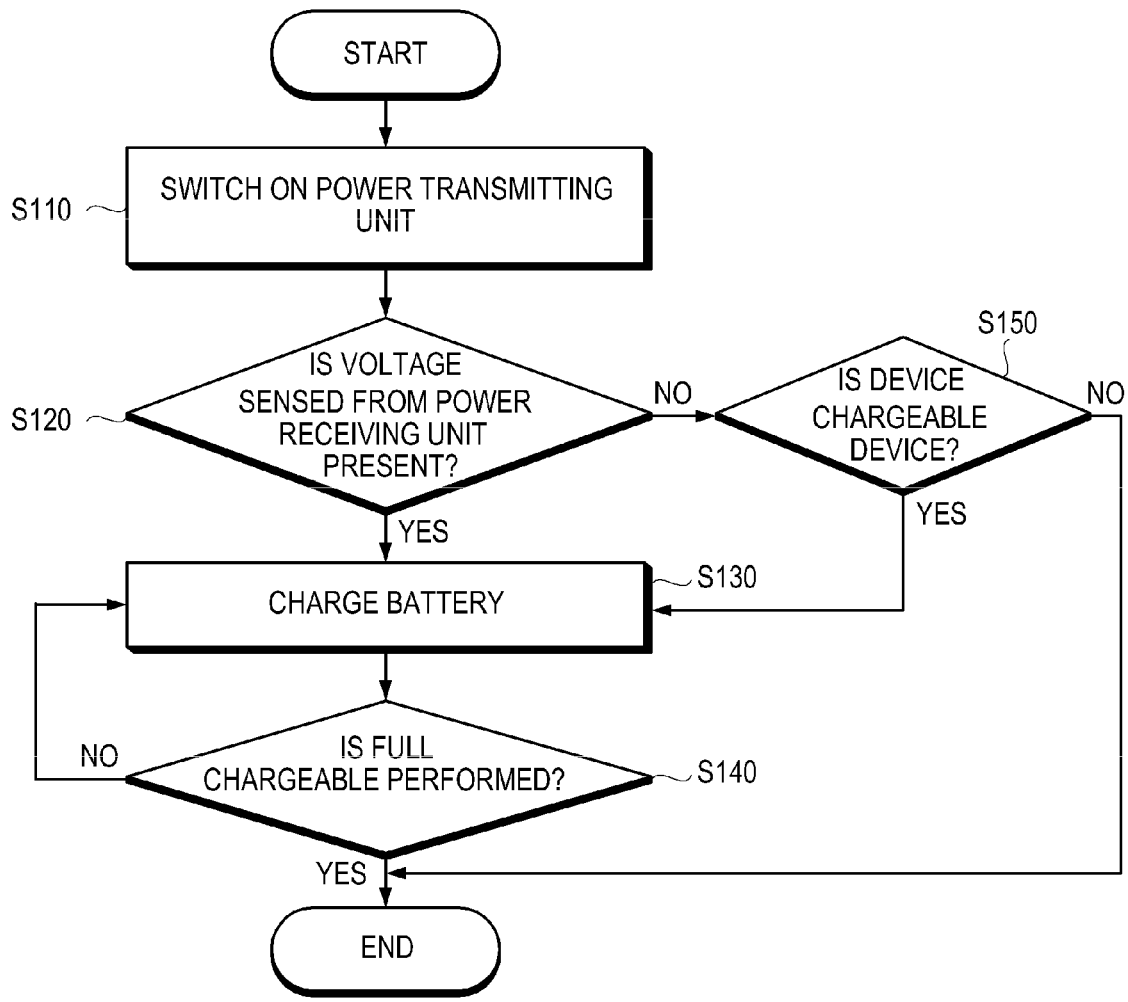
FIG. 8 is a flow chart of a method of controlling the charging apparatus using a pad type electrode contact point according to the first preferred embodiment of the present invention.

FIG. 8 is a flow chart of a method of controlling the charging apparatus using a pad type electrode contact point according to the first preferred embodiment of the present invention.

Referring to FIG. 8, the method of controlling the charging apparatus using a pad type electrode contact point according to the first preferred embodiment of the present invention is configured of an automatic charging scheme and a manual charging scheme.

First, when the manual switch of the power transmitting unit is switched on (S110), the switch control circuit of the power transmitting unit judges whether a voltage sensed from the power receiving unit is present (S120).

In this case, the switch control circuit judges whether the voltage supplied from the fourth contact point electrode is present through the first contact point electrode.

Then, the switch control circuit switches on the automatic switch of the power transmitting unit when the voltage sensed from the power receiving unit is present to allow the power provided form the adaptor to be supplied to the power receiving unit, thereby charging the battery (S130).

More specifically, when the automatic switch is switched on, the power is supplied form the second contact point electrode to the fifth contact point electrode. Therefore, the switching control circuit of the power receiving unit switches on the automatic switch of the power receiving unit to supply the supplied power to the charging circuit. In this case, the charging circuit charges the battery using the supplied power.

Next, when the charging of the battery is completed, the charging circuit ends the charging.

Meanwhile, the switch control circuit switches off the automatic switch of the power transmitting unit when the voltage sensed from the power receiving unit is not present.

In this state, the user judges whether a device is a chargeable device and switches on the manual switch when it is judged that the device is the chargeable device (S150).

Then, the switch control circuit switches on the automatic switch of the power transmitting unit when the manual switch is switched on to allow the power provided form the adaptor to be supplied to the power receiving unit, thereby charging the battery (S130).

As set forth above, according to the preferred embodiment of the present invention, convenience of the user is secured and the charging apparatus is simplified, such that the charging apparatus may be miniaturized and a manufacturing cost of the charging apparatus may be significantly reduced as compared to the wireless charging.

In addition, according to the preferred embodiment of the present invention, a human body harm problem by a high power electromagnetic field, a problem by patent and communication standards, or the like, is avoided, such that the charging apparatus may early enter the market.

Further, according to the preferred embodiment of the present invention, even though the electrodes are exposed to the outside, a short circuit or power leakage are not generated, such that a safe product may be produced.

Furthermore, according to the preferred embodiment of the present invention, an inaccurate electrode contact point is not generated, such that the convenience of the user may be increased.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A charging apparatus using a pad type electrode contact point, the charging apparatus comprising:
   a charging plate having a plate shape, including first and second contact point electrodes having polarities and formed to be exposed and a third contact point electrode not having a polarity and formed to be exposed, and receiving power from an adaptor when a charging voltage of a battery is sensed through the first contact point electrode, thereby providing the power through the second and third contact point electrodes; and
   an attaching plate installed on a portable terminal, including fourth and fifth contact point electrodes having shapes corresponding to those of the first and second contact point electrodes, polarities opposite to those of the first and second contact point electrodes, and formed to be exposed and a sixth contact point electrode having a shape corresponding to the third contact point electrode and formed to be exposed, sensing a remaining voltage of the battery to provide the remaining voltage to the first contact point electrode through the fourth contact point electrode, and receiving power provided from the second and third contact point electrodes through the fourth and sixth contact point electrodes to provide the power to a charging circuit of the portable terminal.

2. The charging apparatus as set forth in claim 1, wherein the charging plate includes the first and second contact point electrodes provided at a central portion thereof.

3. The charging apparatus as set forth in claim 1, wherein the second contact point electrode of the charging plate is formed to enclose the first contact point electrode thereof.

4. The charging apparatus as set forth in claim 1, wherein the charging plate further includes a support formed on a rear surface thereof so as to support the charging plate to stand up the charging plate.

5. The charging apparatus as set forth in claim 1, wherein the charging plate includes:
   a first automatic switch switched on according to a switch control signal to provide the power supplied from the adaptor to the second contact point electrode; and a first switch control circuit generating the switch control signal when the charging voltage is sensed through the first contact point electrode, thereby switching on the first automatic switch.

6. The charging apparatus as set forth in claim 5, wherein the charging plate includes:
   a manual switch switched on an operation by a user to provide the power supplied from the adaptor to the first switch control circuit, and
   the first switch control circuit switches on the first automatic switch when power supplied to the adaptor is sensed through the manual switch.

7. The charging apparatus as set forth in claim 1, wherein the attaching plate includes:
   a main attaching plate installed on the portable terminal, including the fourth and fifth contact point electrodes having the shapes corresponding to those of the first and second contact point electrodes, the polarities opposite to those of the first and second contact point electrodes, and formed to be exposed, sensing the remaining voltage of the battery to provide the remaining voltage to the first contact point electrode through the fourth contact point electrode, and receiving the power provided from the second contact point electrode through the fifth contact point electrode to provide the power to the charging circuit of the portable terminal; and
   a sub attaching plate installed on the portable terminal, including the six contact point electrode having the shape corresponding to that of the third contact point electrodes and formed to be exposed, and receiving the power provided from the third contact point electrode through the sixth contact point electrodes to provide the power to the charging circuit of the portable terminal.

8. The charging apparatus as set forth in claim 1, wherein the attaching plate includes:
   a charging voltage sensing unit detecting the remaining voltage of the battery to provide the remaining voltage to the fourth contact point electrode;
   a second automatic switch switched on to provide the power supplied through the fifth contact point electrode to the charging circuit; and
   a second switch control circuit generating a switch control signal when the voltage is sensed through the second contact point electrode, thereby switching on the second automatic switch.

* * * * *